(12) United States Patent
Zorzella

(10) Patent No.: US 6,434,236 B1
(45) Date of Patent: Aug. 13, 2002

(54) PC SERVER TELECOMMUNICATIONS POWER SYSTEM

(75) Inventor: Peter Zorzella, Manotick (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/189,694

(22) Filed: Nov. 10, 1998

(30) Foreign Application Priority Data

Nov. 12, 1997 (CA) .............................................. 9723909

(51) Int. Cl.[7] ................................................. H04M 9/00
(52) U.S. Cl. ........................ 379/413; 379/418; 379/284
(58) Field of Search ........................... 379/413, 413.01, 379/418, 419

(56) References Cited

U.S. PATENT DOCUMENTS 4,782,517 A * 11/1988 Bernardis et al. ........... 379/284
4,918,572 A    4/1990 Tarver et al.
4,977,532 A * 12/1990 Borkowicz et al. ......... 361/683

FOREIGN PATENT DOCUMENTS

| GB | 2318480 | * | 4/1998 | .......... H04Q/3/545 |
| WO | 9517777 |   | 6/1995 | |
| WO | WO 95/17777 | * | 6/1995 | |

* cited by examiner

*Primary Examiner*—Forester W. Isen
*Assistant Examiner*—Jeffery F Harold
(74) *Attorney, Agent, or Firm*—Jones, Day, Reavis & Pogue

(57) ABSTRACT

A system within a PC server cabinet for receiving an externally supplied loop feed voltage (−48 VDC) and generating a ringing voltage (75 VAC) from the loop feed voltage. For universal applicability, the ringing voltage generator is preferably located in a 5.25 inch standard disk-drive housing of the cabinet, allowing it to fit into any PC. All required telecommunications signaling and power is thereby provided in the PC while limiting accidental user exposure to hazardous ringing signal voltage levels.

9 Claims, 2 Drawing Sheets

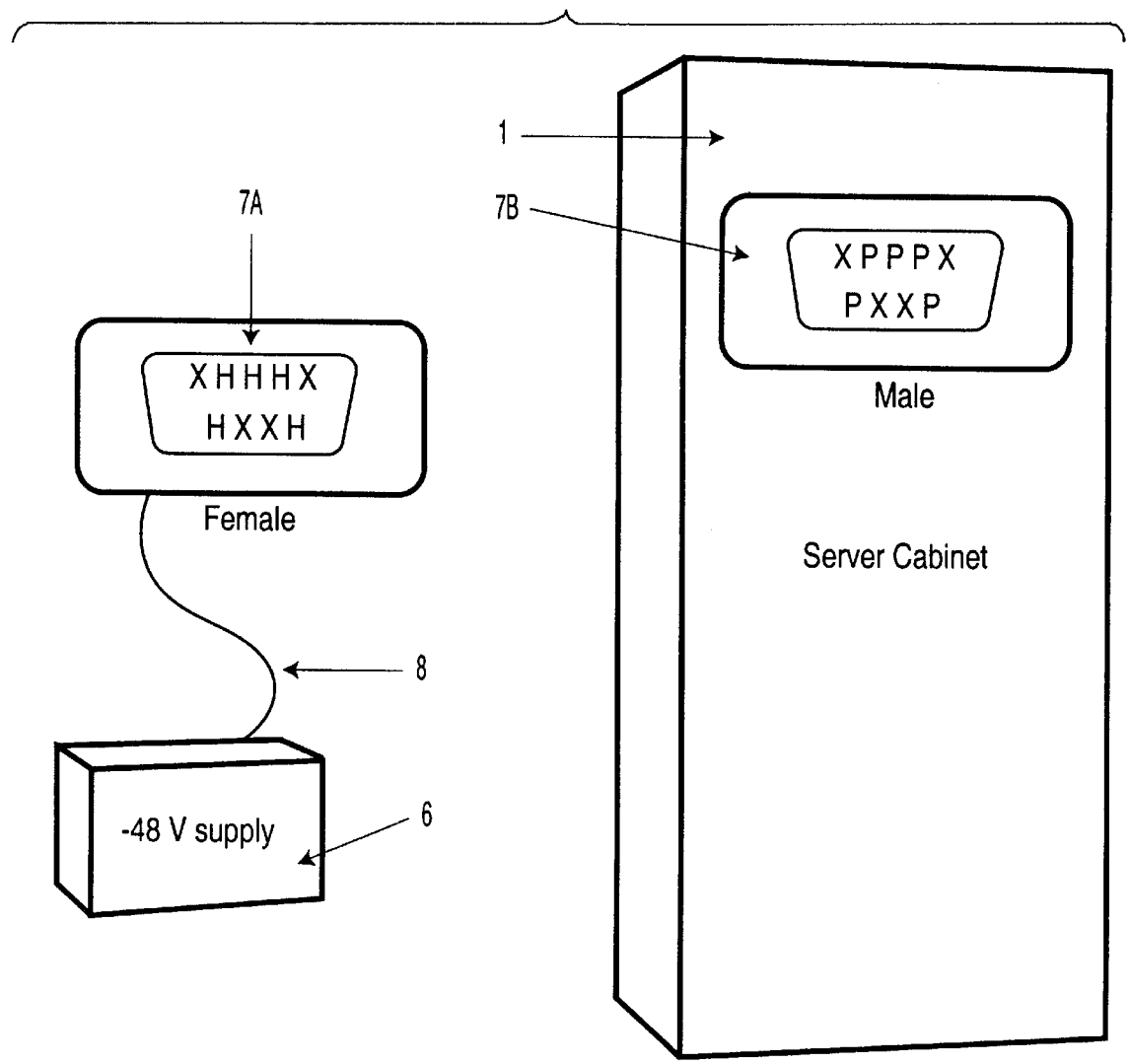

PC SERVER TELECOMMUNICATIONS POWER SYSTEM

FIELD OF THE INVENTION

This invention relates in general to power supply systems for PC (Personal Computer) based telephony systems, and more specifically to a power supply housed in a 5.25 inch standard disk-drive housing within a PC server cabinet for receiving external loop feed voltage (−48 VDC) from an external source and generating ringing voltage (75 VAC) therefrom.

BACKGROUND OF THE INVENTION

Significant potential problems exist in the integration of telecommunications into OEM PC cabinets. The root cause for these problems is that the power requirements for telephony systems are different from those of off-the-shelf PCs. For example, telephony (viz. POTS) line support requires the provision of a ringing power supply (75 VAC/−48 VDC), which is a hazardous voltage. PC cabinets are normally user-accessible, which invites accidental exposure of untrained personnel to these dangerous voltage levels. Also, PC server cabinets do not provide dedicated telephony signal grounding.

One solution to the problem of PC server connectivity to telecommunications equipment is the provision of a peripheral cabinet incorporating a Telecommunications Hub which attaches to a PC, as set forth in U.S. patent application Ser. No. 08/733,807, the contents of which are incorporated herein. This solution can be cost-prohibitive when implemented in a small configuration. Other solutions use external power supplies for generating both loop feed and ringing voltages, which also give rise to potential hazards. The ringing voltage is above the level generally regarded as a secondary hazardous voltage by international safety approvals bodies (30 VAC). Accordingly, this solution gives rise to potentially hazardous voltages within the enclosure, notwithstanding that the enclosure is intended to be accessed only by trained personnel for service.

SUMMARY OF THE INVENTION

According to the present invention, a system is provided for supplying loop feed voltage (−48 VDC) from an external source such as a stand-alone power supply or CO (Central Office) battery and generating the ringing voltage (75 VAC) from the loop feed voltage. For universal applicability, the ringing voltage generator is preferably located in a 5.25 inch standard disk-drive housing, allowing it to fit into any PC. Limiting the output of this module to Telecommunication Network Voltage levels means that the PC can be safely serviced with the 48V power left on (although this is not recommended).

BRIEF DESCRIPTION OF THE DRAWINGS

An embodiment of the invention will now be described below with reference to the following drawings, in which:

FIG. 2 is a schematic representation of a connector for supplying DC loop feed voltage to the PC cabinet.

DETAILED DESCRIPTION OF THE PREFERRED EMBODIMENT

Figure 1:
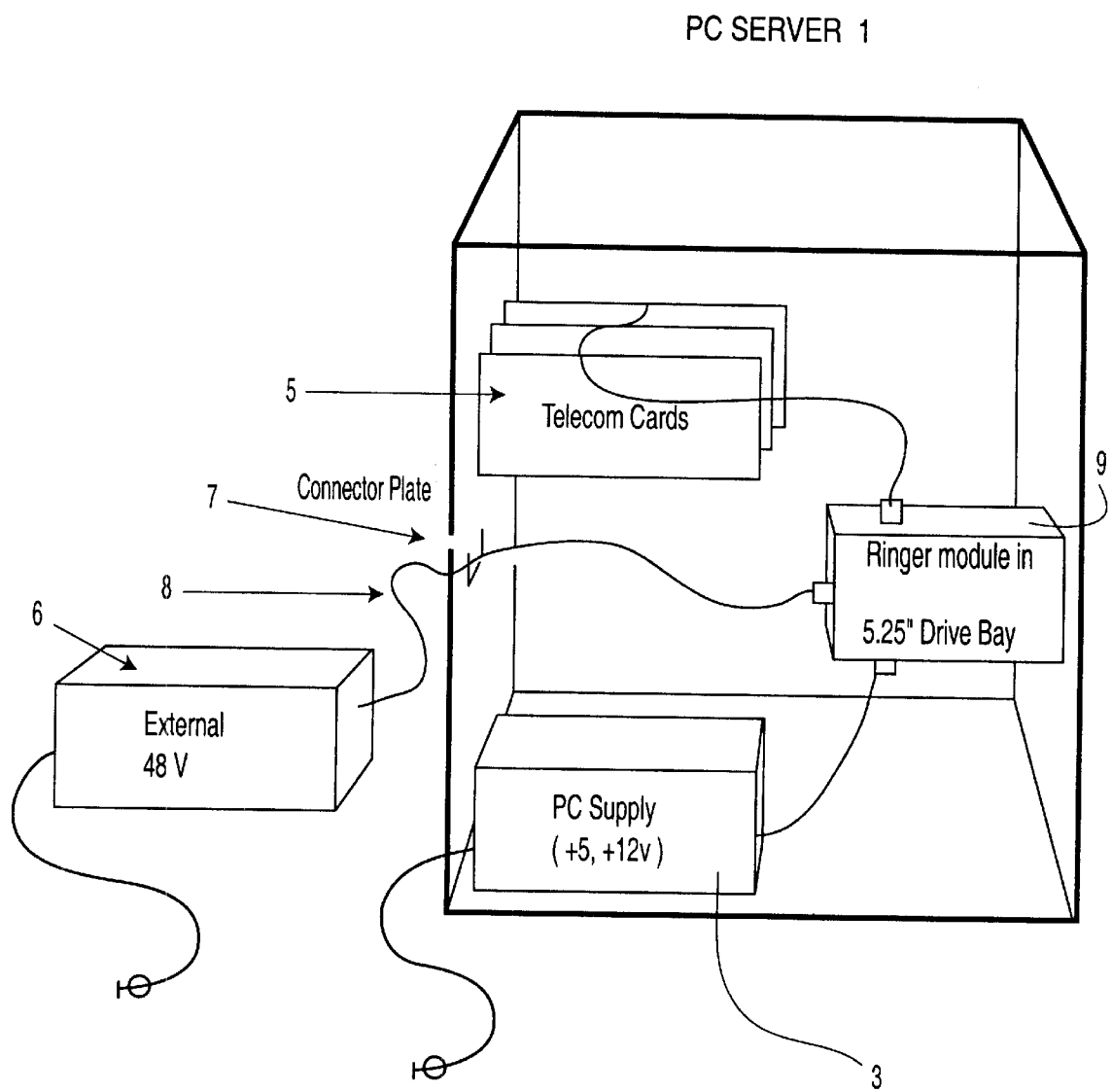
FIG. 1 is a block schematic diagram of a telecommunications power supply system according to the present invention within a PC cabinet.

A PC server cabinet 1 is provided with standard components such as a CPU motherboard, hard drive, memory, etc. (not shown), all of which are powered by a PC power supply 3 in a well known manner.

A plurality of telecommunication cards 5 are interconnected via the internal PC ISA bus (not shown) for control, and via an MVIP 90 bus (not shown) for switched voice, all such interconnections being well known in the art.

In accordance with the preferred embodiment, loop feed voltage (−48 VDC) is brought into the cabinet 1 from an external source 6 using a standard 9-pin D connector 7 having a female portion connected to the external source 6 and a male portion mounted in a punchout as is commonly found at the rear of such a cabinet 1. In embodiments where a punchout is not provided for a 9-pin connector, adapter plates may be provided to fit 15-pin and 25-pin D connectors and plates for card slots provided where a PCI/ISA board faceplate is used. The loop feed source 6 may be in the form of an external power supply or may be obtained directly from CO battery.

In order to ensure that the −48 VDC loop feed voltage is not accidentally plugged into any 9-pin connector at the rear of the cabinet 1 other than the connector 7 intended to receive the loop feed voltage, four of the holes in the female portion 7A are filled, as shown in FIG. 2. The corresponding pins on the male portion 7B are also removed. Thus, five holes/pins are utilized wherein, for safety and redundancy, two 48V feeds and two returns are provided, along with a pin/hole for grounding the shield on the supply cable 8 providing continuity in the shielding.

According to the invention, the potentially hazardous ringing voltage is generated inside a ringer module 9 within a metal container mounted within a standard 5.25" drive bay of the cabinet 1. There are normally several free 5.25" bays in standard PC server cabinets to accommodate CD ROMS, RAID disks, etc.

The ringer module 9 of the preferred embodiment has six outputs regulated to Telecom Network Voltage (TNV) standards for providing 30 mA ringing voltage signals for up to six of the cards 5 (i.e. 2.5 REN of ringing per card at 12 mA per REN). The actual generation of ringing voltage from 48V is done using well known off-the shelf parts, and does not form part of the present invention. When loaded for five seconds, the ringing output is interrupted for one second to ensure that in the event of accidental human exposure, escape is possible when the output is interrupted. This safety feature may be implemented in a number of ways. According to the preferred embodiment, loading of the ringer outputs is sensed, and a Programmable Logic Array (not shown) begins counting upon the outputs being fully loaded. The AC Ringing voltage is used as a time reference. When 5 seconds have passed, the Programmable Logic Array closes a relay (not shown) on the output for one second, again using the ringing voltage AC as a time reference.

It will be appreciated that, although one embodiment of the invention has been described in detail, various changes and modifications may be made. For example, different connectors/plates could used on the back of the PC cabinet 1. The external battery voltage (−48 VDC) could feed directly into the ringer module 9 without a connector 7, by means of a plate with a grommet or other suitable attachment. Instead of using the 5.25" bay, an ISA or PCI card-slot may be used to house the ringer module 9. All such changes and modifications may be made without departing from the sphere and scope of the invention as defined by the claims appended hereto.

What is claimed is:

1. A power supply system for providing telecommunications power signals to a PC server cabinet, comprising an external source of DC loop feed voltage, means for supplying said DC loop feed voltage inside said cabinet, a ringer module mounted within said cabinet and connected to said means for supplying for receiving said DC loop feed voltage and in response generating ringing voltage from the loop feed voltage.

2. The power supply system of claim 1 wherein said external source is a power supply.

3. The power supply system of claim 1, wherein said external source is a central office battery.

4. The power supply system of claim 1, wherein said means for supplying is a connector mounted to a surface of said cabinet.

5. The power supply system of claim 4 wherein said connector is a D-type connector mounted through a punchout in said surface of said cabinet.

6. The power supply system of claim 5, wherein said connector comprises a female portion connected to said external source and a male portion connected to said ringer module.

7. The power supply of claim 6, wherein predetermined pins on said male portion of said connector are removed and predetermined holes on said female portion are filled.

8. The power supply of claim 1, wherein said ringer module is mounted within a disk drive housing of said cabinet.

9. The power supply system of claim 1, wherein said ringer module is mounted within a card slot in said cabinet.

* * * * *